(12) United States Patent
Kondo et al.

(10) Patent No.: US 9,983,563 B2
(45) Date of Patent: May 29, 2018

(54) METHOD AND APPARATUS FOR CONTROLLING A MACHINE TOOL

(71) Applicant: Okuma Corporation, Niwa-Gun (JP)

(72) Inventors: Yasunori Kondo, Niwa-Gun (JP); Tetsuya Matsushita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 460 days.

(21) Appl. No.: 14/629,925

(22) Filed: Feb. 24, 2015

(65) Prior Publication Data

US 2015/0277424 A1 Oct. 1, 2015

(30) Foreign Application Priority Data

Mar. 31, 2014 (JP) ................................. 2014-072902

(51) Int. Cl.
*G05B 19/02* (2006.01)
*G05B 19/402* (2006.01)
*G05B 19/404* (2006.01)

(52) U.S. Cl.
CPC ......... *G05B 19/402* (2013.01); *G05B 19/404* (2013.01); *G05B 2219/49194* (2013.01);
(Continued)

(58) Field of Classification Search
CPC ................ G05B 19/402; G05B 19/404; G05B 2219/49194; G05B 2219/49198; G05B 2219/49202; G05B 2219/50047
(Continued)

(56) References Cited

U.S. PATENT DOCUMENTS 5,373,220 A * 12/1994 Tomoguchi .......... G05B 19/404
            318/568.1
8,024,068 B2 * 9/2011 Gray ..................... B25J 9/1602
            382/153
(Continued)

FOREIGN PATENT DOCUMENTS

JP   2004-272887 A1   9/2004
JP   2009-104317 A1   5/2009

OTHER PUBLICATIONS

Office Action (and English translation obtained from the Global Dossier) from a corresponding Chinese patent application (CN 201510145549.4) dated Feb. 1, 2018, 17 pages.
(Continued)

*Primary Examiner* — Kenneth M Lo
*Assistant Examiner* — Michael J. Huntley
(74) *Attorney, Agent, or Firm* — Burr & Brown, PLLC (57) ABSTRACT

A method for controlling a machine tool in which a main spindle on which a tool is mounted and a table holding a workpiece are moved relative to each other by two or more translation axes that are not perpendicular to each other and at least one rotation axis. In the method, an error in a position of the tool with respect to the workpiece due to a geometric error is corrected to calculate a command value for controlling the translation axis. The method includes a conversion step of converting the error and a correction value for correcting the error by performing a homogeneous coordinate transformation from a workpiece coordinate system to the imaginary Cartesian coordinate system, and a correction value calculation step of calculating a correction value in a command value coordinate system of the translation axis by performing a homogeneous coordinate transformation of the correction value.

14 Claims, 6 Drawing Sheets

(52) U.S. Cl.
CPC .............. *G05B 2219/49198* (2013.01); *G05B 2219/49202* (2013.01); *G05B 2219/50047* (2013.01)

(58) Field of Classification Search
USPC ........................................................ 700/193
See application file for complete search history.

(56) References Cited

U.S. PATENT DOCUMENTS

| | | | | |
|---|---|---|---|---|
| 2005/0107000 | A1* | 5/2005 | Otsuki ................. | G05B 19/404 451/5 |
| 2012/0001583 | A1* | 1/2012 | Otsuki ................. | G05B 19/404 318/632 |

OTHER PUBLICATIONS

VCM650m, Chinese Master's Theses Full Text Database, Engineering Science and Technology, ISSN: 1674-0246, Southwest Jiaotong University, Publication Date: Apr. 15, 2012, 10 pages.
Chinese Doctoral Dissertations Full Text Database, Engineering Science and Technology, ISSN: 1674-022X, CN 11-9133/G, Publication Date: Mar. 15, 2008, 5 pages.

\* cited by examiner

METHOD AND APPARATUS FOR CONTROLLING A MACHINE TOOL

This application claims the benefit of Japanese Patent Application Number 2014-072902 filed on Mar. 31, 2014, the entirety of which is incorporated by reference.

BACKGROUND OF THE INVENTION

Field of the Invention

The present invention relates to methods and apparatuses for controlling a machine tool in which a main spindle on which a tool is mounted and a table that holds a workpiece are moved relative to each other by two or more translation axes that are not perpendicular to each other and at least one rotation axis to machine the workpiece with the tool, and an error in the position of the tool with respect to the workpiece due to a geometric error is corrected to calculate a command value for controlling the translation axis.

Description of Related Art

Figure 6:
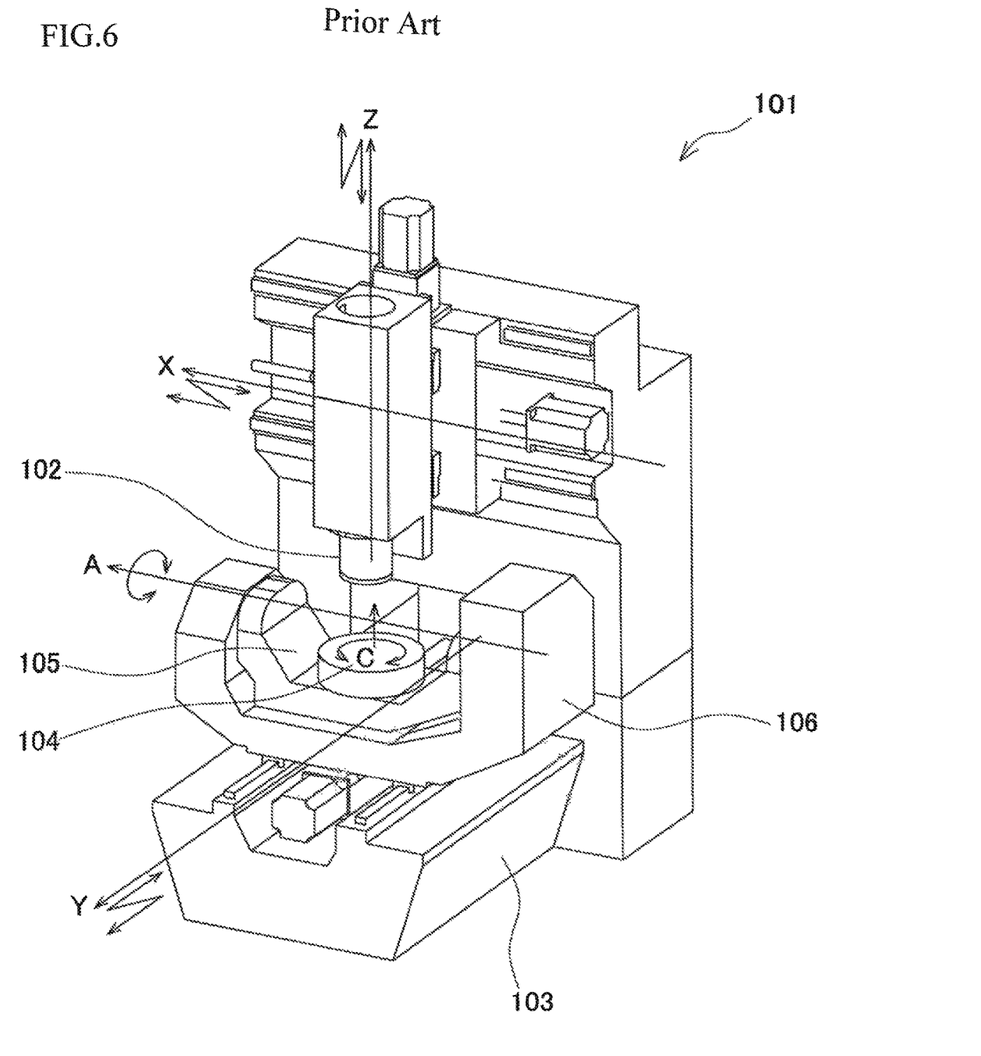
FIG. 6 is a schematic diagram of a conventional 5-axis control machining center.

An example of such a machine tool is shown in FIG. 6. FIG. 6 is a schematic view of a 5-axis control machining center 101 having three translation axes and two rotation axes. A spindle head 102 has two translational degrees of freedom relative to a bed 103 by X- and Z-axes serving as translation axes perpendicular to each other. A table 104 has a single rotational degree of freedom relative to a cradle 105 by a C-axis serving as a rotation axis. The cradle 105 has a single rotational degree of freedom relative to a trunnion 106 by an A-axis serving as a rotation axis. The A-axis and the C-axis are perpendicular to each other. The trunnion 106 has a single translational degree of freedom relative to the bed 103 by a Y-axis serving as a translation axis perpendicular to the X- and Z-axes. Each axis is driven by a servomotor (not shown) that is controlled by a numerical control apparatus (not shown). A workpiece is fixed to the table 104, a tool (not shown) is mounted on the spindle head 102 and rotated. The workpiece is thus machined by controlling the relative positions of the workpiece and the tool.

Factors that affect motion accuracy of the 5-axis control machining center 101, for example, include geometric errors between the axes such as an error in the center position of the rotation axis (shift from its intended position) and an error in inclination of the rotation axis (squareness or parallelism between the axes). As such a geometric error decreases motion accuracy of the 5-axis control machining center 101 and decreases machining accuracy of workpieces, it is required to reduce the geometric error by adjustment. However, it is difficult to eliminate the geometric error by adjustment, and control of correcting the geometric error is performed to obtain accurate machining.

Such a method as disclosed in Japanese Patent Application Publication No. 2004-272887 (JP 2004-272887 A) proposes a method wherein a geometric error is corrected. In the method disclosed in JP 2004-272887 A, the position of the distal end point of a tool is converted to the position of each translation axis in view of a geometric error of a machine tool, and these positions of the translation axes are used as command values for controlling the translation axes to correct a position error of the distal end point of the tool due to the geometric error.

Japanese Patent Application Publication No. 2009-104317 (JP 2009-104317 A) discloses a method for calculating command values for controlling translation axes. In this method, a deformation error associated with operation of a machine tool, a positioning error that is caused according to a command position for the translation axis, and an error that is caused by thermal displacement due to heat generation etc. of each element of the machine tool are regarded as a geometric error. Correction values for the translation axes calculated based on the geometric error are added to command values for the translation axes. The command values for controlling the translation axes are thus calculated.

However, the methods disclosed in JP 2004-272887 A and JP 2009-104317 A are intended for those machine tools in which the X-, Y-, and Z-axes serving as translation axes are perpendicular to each other. Accordingly, with these methods, a geometric error of a machine tool including two or more translation axes that are not perpendicular to each other cannot be corrected, and a command value for the translation axis cannot be calculated.

SUMMARY OF THE INVENTION

An object of the present invention is to provide a method and apparatus for controlling a machine tool, by which a geometric error of a machine tool including two or more translation axes that are not perpendicular to each other can be corrected to calculate a command value for the translation axis.

A method for controlling a machine tool according to a first aspect of the present invention is a method for controlling a machine tool in which a main spindle on which a tool is mounted and a table that holds a workpiece are moved relative to each other by two or more translation axes that are not perpendicular to each other and at least one-rotation axes to machine the workpiece with the tool. In the method, an error in a position of the tool with respect to the workpiece due to a geometric error is calculated from a position of the tool in presence of the geometric error and an ideal position of the tool. The position of the tool in presence of the geometric error is obtained by performing a homogeneous coordinate transformation from a tool coordinate system to a workpiece coordinate system with the geometric error being taken into consideration. The ideal position of the tool is obtained by performing the homogeneous coordinate transformation from the tool coordinate system to the workpiece coordinate system with the geometric error not being taken into consideration. Then, the error is corrected to calculate a command value for controlling the translation axis. The method includes a conversion step, a correction value calculation step and an update step. In the conversion step, the error is converted to an imaginary Cartesian coordinate system that is imaginarily set so that the two or more translation axes are perpendicular to each other and a correction value for correcting the error is converted to the imaginary Cartesian coordinate system by performing a homogeneous coordinate transformation from the workpiece coordinate system to the imaginary Cartesian coordinate system. In the correction value calculation step, a correction value in a command value coordinate system of the translation axis is calculated by performing a homogeneous coordinate transformation of the correction value converted to the imaginary Cartesian coordinate system in the conversion step from the imaginary Cartesian coordinate system to the command value coordinate system. In the update step, the command value for controlling the translation axis is updated by adding the correction value calculated in the correction value calculation step to the command value.

According to a second aspect of the present invention, in the first aspect, in the conversion step, the homogeneous coordinate transformation of the error and the correction value from the workpiece coordinate system to the imaginary Cartesian coordinate system is performed in view of an inclination angle of the translation axis included in the two or more translation axes that are not perpendicular to each other with respect to a predetermined reference direction.

According to a third aspect of the present invention, in the first or second aspect, the method further includes a selection step of selecting an arbitrary axis configuration having an arbitrary translation axis included in the two or more translation axes and an arbitrary rotation axis included in the at least one rotation axes. Further, in the conversion step, the error and the correction value are converted to an arbitrary imaginary Cartesian coordinate system that is imaginarily set so that arbitrary two or more translation axes included in the arbitrary axis configuration selected in the selection step are perpendicular to each other by performing the homogeneous coordinate transformation from the workpiece coordinate system to the arbitrary imaginary Cartesian coordinate system. Then, in the correction value calculation step, the correction value in the command value coordinate system is calculated by performing the homogeneous coordinate transformation of the correction value converted to the arbitrary imaginary Cartesian coordinate system in the conversion step from the arbitrary imaginary Cartesian coordinate system to the command value coordinate system.

According to a fourth aspect of the present invention, in the third aspect, the arbitrary translation axis is the translation axis to be actually used to machine the workpiece, and the arbitrary rotation axis is the rotation axis to be actually used to machine the workpiece. In the selection step, based on determination information for determining a used axis configuration having the translation axis to be actually used to machine the workpiece and the rotation axis to be actually used to machine the workpiece, it is determined whether or not there is the used axis configuration in those axis configurations which have the translation axis included in the two or more translation axes and the rotation axis included in the at least one rotation axes, and the determined used axis configuration is selected as the arbitrary axis configuration. In the conversion step, the error and the correction value are converted to one imaginary Cartesian coordinate system that is imaginarily set so that the two or more translation axes included in the used axis configuration selected in the selection step are perpendicular to each other and that is included in the arbitrary imaginary Cartesian coordinate system, by performing the homogeneous coordinate transformation from the workpiece coordinate system to the one imaginary Cartesian coordinate system. In the correction value calculation step, the correction value in the command value coordinate system is calculated by performing the homogeneous coordinate transformation of the correction value converted to the one imaginary Cartesian coordinate system in the conversion step from the one imaginary Cartesian coordinate system to the command value coordinate system.

According to a fifth aspect of the present invention, in the fourth aspect, the method further includes an error decision step of deciding that the error calculated from the position of the tool in the presence of the geometric error and the ideal position of the tool is to retain a previous error or to be set to zero if it is determined in the selection step that there is the axis configuration that is not to be used to machine the workpiece in the axis configurations.

An apparatus for controlling a machine tool according to a sixth aspect of the present invention is an apparatus for controlling a machine tool in which a main spindle on which a tool is mounted and a table that holds a workpiece are moved relative to each other by two or more translation axes that are not perpendicular to each other and at least one rotation axis to machine the workpiece with the tool. In the apparatus, an error in a position of the tool with respect to the workpiece due to a geometric error is calculated from a position of the tool in presence of the geometric error and ideal position of the tool. The position of the tool in presence of the geometric error is obtained by performing a homogeneous coordinate transformation from a tool coordinate system to a workpiece coordinate system with the geometric error being taken into consideration. The ideal position of the tool is obtained by performing the homogeneous coordinate transformation from the tool coordinate system to the workpiece coordinate system with the geometric error not being taken into consideration. Further, the error is corrected to calculate a command value for controlling the translation axis. The apparatus includes a conversion unit, a correction value calculation unit and an update unit. The conversion unit converts the error to an imaginary Cartesian coordinate system that is imaginarily set so that the two or more translation axes are perpendicular to each other and converts a correction value for correcting the error to the imaginary Cartesian coordinate system by performing a homogeneous coordinate transformation from the workpiece coordinate system to the imaginary Cartesian coordinate system. The correction value calculation unit calculates a correction value in a command value coordinate system of the translation axis by performing a homogeneous coordinate transformation of the correction value converted to the imaginary Cartesian coordinate system by the conversion unit from the imaginary Cartesian coordinate system to the command value coordinate system. The update unit updates the command value for controlling the translation axis by adding the correction value calculated by the correction value calculation unit to the command value.

According to a seventh aspect of the present invention, in the sixth aspect, the conversion unit performs the homogeneous coordinate transformation of the error and the correction value from the workpiece coordinate system to the imaginary Cartesian coordinate system in view of an inclination angle of the translation axis included in the two or more translation axes that are not perpendicular to each other with respect to a predetermined reference direction.

According to an eighth aspect of the present invention, in the sixth or seventh aspect, the apparatus further includes a selection unit of selecting an arbitrary axis configuration having an arbitrary translation axis included in the two or more translation axes and an arbitrary rotation axis included in the at least one rotation axis. In the apparatus, the conversion unit converts the error and the correction value to an arbitrary imaginary Cartesian coordinate system that is imaginarily set so that arbitrary two or more translation axes included in the arbitrary axis configuration selected by the selection unit are perpendicular to each other by performing the homogeneous coordinate transformation from the workpiece coordinate system to the arbitrary imaginary Cartesian coordinate system. Further, the correction value calculation unit calculates the correction value in the command value coordinate system by performing the homogeneous coordinate transformation of the correction value converted to the arbitrary imaginary Cartesian coordinate system by the conversion unit from the arbitrary imaginary Cartesian coordinate system to the command value coordinate system.

According to a ninth aspect of the present invention, in the eighth aspect, the arbitrary translation axis is the translation axis to be actually used to machine the workpiece and the arbitrary rotation axis is the rotation axis to be actually used to machine the workpiece. The apparatus further includes a storage unit that stores determination information for determining a used axis configuration having the translation axis to be actually used to machine the workpiece and the rotation axis to be actually used to machine the workpiece. The selection unit determines based on the determination information stored in the storage unit whether or not there is the used axis configuration in axis configurations which have the translation axis included in the two or more translation axes and the rotation axis included in the at least one rotation axis, and selects the determined used axis configuration as the arbitrary axis configuration. The conversion unit converts the error and the correction value to one imaginary Cartesian coordinate system that is imaginarily set so that the two or more translation axes included in the used axis configuration selected by the selection unit are perpendicular to each other and that is included in the arbitrary imaginary Cartesian coordinate system, by performing the homogeneous coordinate transformation from the workpiece coordinate system to the one imaginary Cartesian coordinate system. The correction value calculation unit calculates the correction value in the command value coordinate system by performing the homogeneous coordinate transformation of the correction value converted to the one imaginary Cartesian coordinate system by the conversion unit from the one imaginary Cartesian coordinate system to the command value coordinate system.

According to a tenth aspect of the present invention, in the ninth aspect, the apparatus further includes an error decision unit that decides that the error calculated from the position of the tool in the presence of the geometric error and the ideal position of the tool is to retain a previous error or to be set to zero if it is determined by the selection unit that there is the axis configuration that is not to be used to machine the workpiece in the axis configurations.

In the method for controlling the machine tool according to the first aspect of the present invention and the apparatus for controlling the machine tool according to the sixth aspect of the present invention, the correction value for correcting in the command value coordinate system the error in the position of the tool with respect to the workpiece due to the geometric error can be calculated by a simple method. Namely, first a homogeneous coordinate transformation of the error in the position of the tool with respect to the workpiece due to the geometric error and the correction value for correcting this error is performed from the workpiece coordinate system to the imaginary Cartesian coordinate system. Then, a homogeneous coordinate transformation of the correction value in the imaginary Cartesian coordinate system is performed to the command value coordinate system of the translation axis. The command value for controlling the translation axis can then be updated by a simple method, namely, by adding the calculated correction value to the command value. Combining these simple methods can correct the geometric error of the machine tool including two or more translation axes that are not perpendicular to each other, and can calculate the command value for the translation axis.

According to the second and seventh aspects of the present invention, the inclination angle of the translation axis included in the two or more translation axes that are not perpendicular to each other with respect to the predetermined reference direction can be specified. Then, the error in the position of the tool and the correction value for correcting this error can be convened from the workpiece coordinate system to the imaginary Cartesian coordinate system by the homogeneous coordinate transformation.

According to the third and eighth aspects of the present invention, the correction value for correcting the error in the position of the tool with respect to the workpiece due to the geometric error can be calculated for the axis configuration having the arbitrary translation axis and the arbitrary rotation axis.

According to the fourth and ninth aspects of the present invention, the correction value for correcting the error in the position of the tool with respect to the workpiece due to the geometric error can be calculated for the used axis configuration having the translation and rotation axes that are to be actually used to machine the workpiece.

According to the fifth and tenth aspects of the present invention, calculation of the error in the position of the tool with respect to the workpiece due to the geometric error can be eliminated for those axis configurations which are not to be used to machine the workpiece. This can reduce calculation load for calculation of this error.

DETAILED DESCRIPTION OF THE EMBODIMENTS

Figure 1:
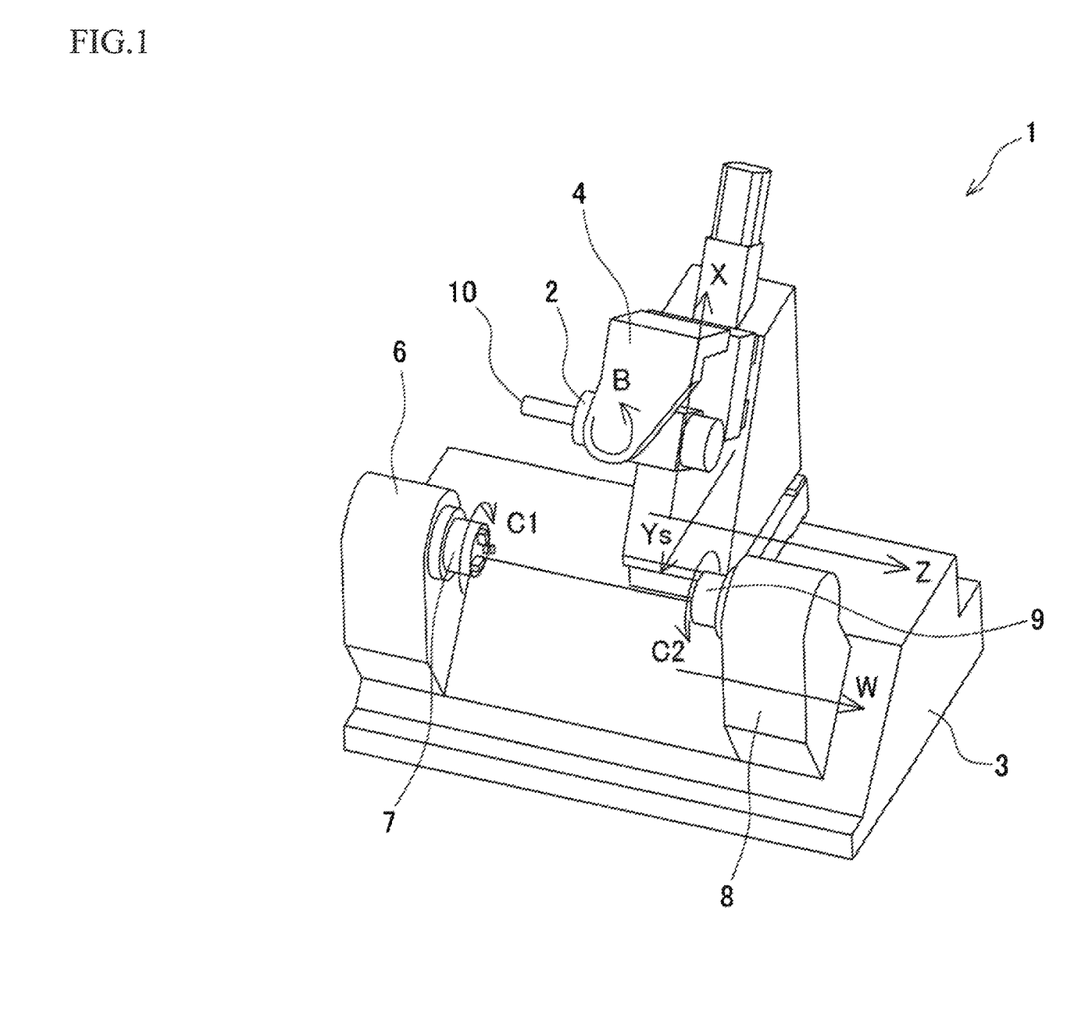
FIG. 1 is a schematic diagram of a multitasking lathe according to an embodiment of the present invention.
Figure 2:
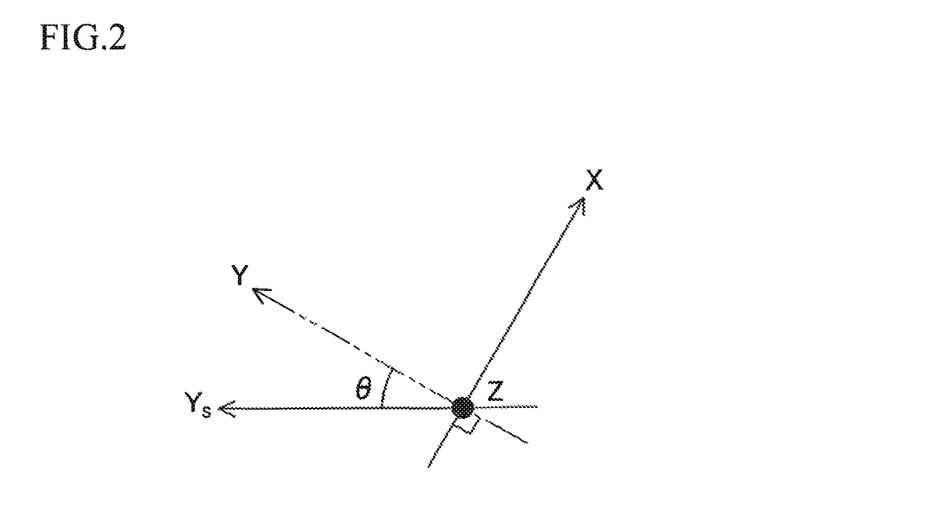
FIG. 2 is a diagram illustrating a state where a Ys-axis serving as a translation axis is inclined with respect to an X-axis serving as a translation axis.

An embodiment of the present invention will be described with reference to FIGS. 1 to 5. A multitasking lathe 1 shown in FIG. 1 is an example of the machine tool in the present invention, and has four translation axes (X-axis, Ys-axis, Z-axis, and W-axis) and three rotation axes (B-axis, C1-axis, and C2-axis). A spindle head 2 has three translational degrees of freedom relative to a bed 3 by the X-, Ys-, and Z-axes serving as translation axes that are not perpendicular to each other. In the present embodiment, as shown in FIG. 2, the X-axis and the Ys-axis are not perpendicular to each other, and the Ys-axis is inclined by an angle θ with respect to a Y-axis. The spindle head 2 has a single rotational degree of freedom by the B-axis serving as a rotation axis included in a tool rest 4.

A first headstock 6 is fixed to the bed 3 and has a single rotational degree of freedom by the rotation axis C1. A first spindle portion 7 included in the first headstock 6 is rotatable about the rotation axis C1, and a workpiece (not shown) can be attached to the first spindle portion 7. Further, a second headstock 8 has a single translational degree of freedom relative to the bed 3 by the W-axis serving as a translation axis parallel to the Z-axis. The second headstock 8 also has a single rotational degree of freedom by the C2-axis serving as a rotation axis. A second spindle portion 9 included in the second headstock 8 is rotatable about the rotation axis C2, and a workpiece (not shown) can also be attached to the second spindle portion 9. The translation axes (X-axis, Ys-axis, Z-axis, and W-axis) and the rotation axes (B-axis, C1-axis, and C2-axis) are driven by servomotors 25a to 25g (see FIG. 3) that are controlled by a numerical control apparatus 20 described below. The workpiece is machined into a desired shape with a tool 10 (see FIG. 1) mounted on the spindle head 2 while the relative positions of the tool 10 and the workpiece are controlled. The first headstock 6 and the second headstock 8 are examples of the table in the present invention.

Figure 3:
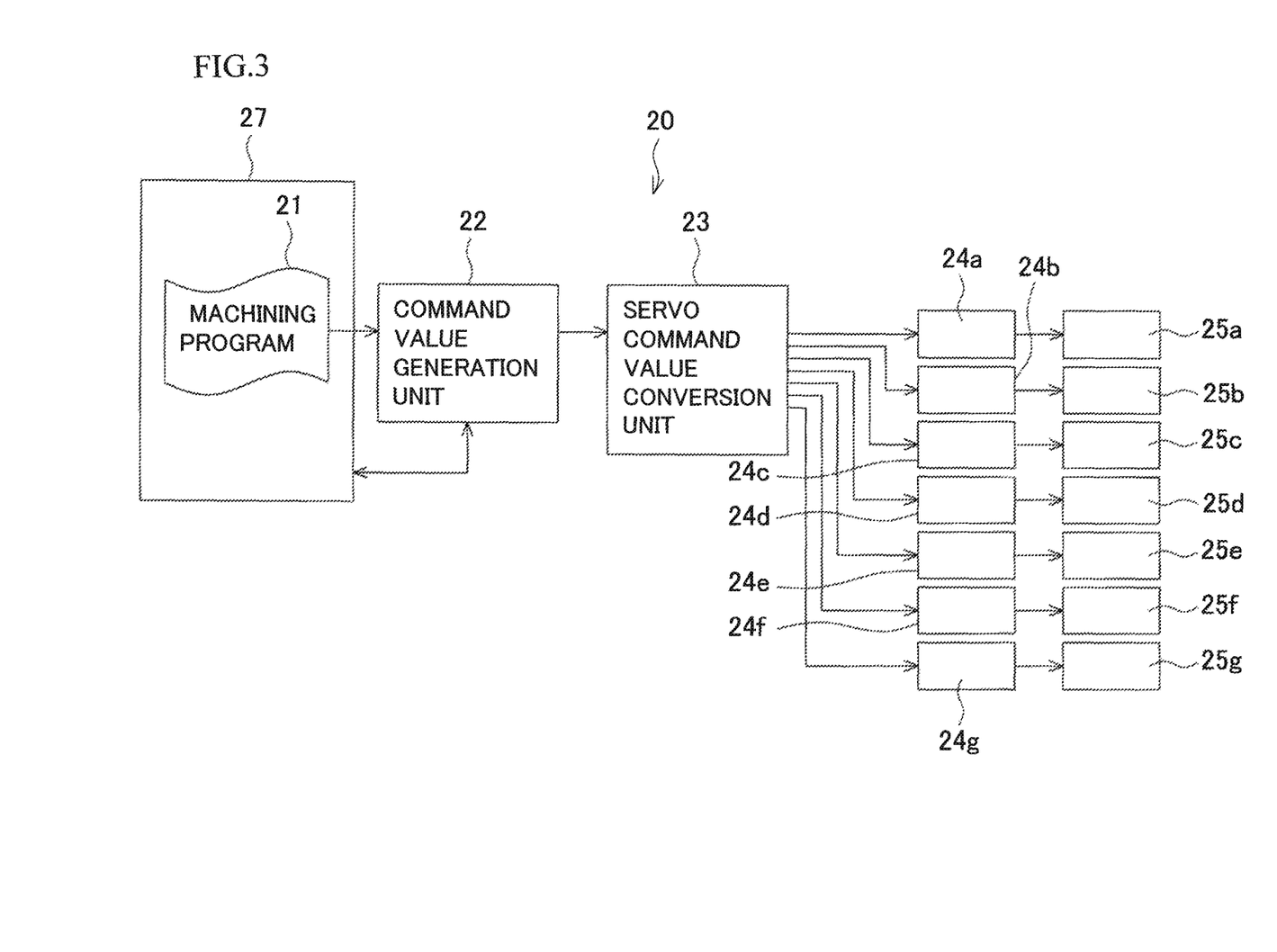
FIG. 3 is a block diagram of a numerical control apparatus that performs a control method according to the embodiment.

FIG. 3 shows an example of the numerical control apparatus 20 that performs control according to the present embodiment. The numerical control apparatus 20 includes a command value generation unit 22 and a servo command value conversion unit 23. The command value generation unit 22 generates a command value for each axis (B-axis, C1-axis, C2-axis, X-axis, Ys-axis, Z-axis, and W-axis) when a machining program 21 is input. In the machining program 21, a command coordinate value of the distal end position of the tool 10 is described as a command to move the tool 10 to a machining position when machining a workpiece. The command values thus generated are transmitted to the servo command value conversion unit 23. In response to the command values, the servo command value conversion unit 23 computes a servo command value for each axis and transmits the servo command values to servo amplifiers 24a to 24g corresponding to the axes. The servo amplifiers 24a to 24g corresponding to the axes drive the servomotors 25a to 25g, respectively, to control the relative position and attitude of the tool 10 relative to the first headstock 6 or the second headstock 8. The numerical control apparatus 20 further includes a storage unit 27 as shown in FIG. 3. The machining program 21 and a geometric error obtained by actual measurement described below are stored in the storage unit 27.

In the present embodiment, geometric errors are defined by a total of six components ($\delta x$, $\delta y$, $\delta z$, $\alpha$, $\beta$, and $\gamma$), namely, three directions of relative translation errors and three directions of relative rotation errors between adjacent ones of the axes. In the multitasking lathe 1 of the present embodiment, an axis configuration from the workpiece to the tool 10 (hereinafter referred to as the "first axis configuration") is C1-axis . . . Z-axis . . . Ys-axis . . . X-axis . . . B-axis. There are 13 geometric errors in the first axis configuration. Another axis configuration (hereinafter referred to as the "second axis configuration") is C2-axis . . . W-axis . . . Z-axis . . . Ys-axis . . . X-axis . . . B-axis. There are 15 geometric errors in the second axis configuration.

The 13 geometric errors in the first axis configuration are represented by $\delta x_{11}$, $\delta z_{11}$, $\alpha_{11}$, $\beta_{11}$, $\alpha_{12}$, $\gamma_{12}$, $\beta_{13}$, $\gamma_{13}$, $\alpha_{14}$, $\delta x_{15}$, $\delta y_{15}$, $\alpha_{15}$, and $\beta_{15}$, where "x", "y" or "z" represents the name of the axis, the first subscript represents the axis configuration number, and the second subscript represents the order from the tool 10 toward the workpiece. These geometric errors mean an error in the center position of the B-axis in the X direction, an error in the center position of the B-axis in the Z direction, squareness between the first headstock 6 and the Y-axis, an error in the origin of the B-axis, squareness between the B-axis and the Z-axis, squareness between the B-axis and the X-axis, squareness between the Z-axis and the X-axis, squareness between the X-axis and the Y-axis, squareness between the Y-axis and the Z-axis, an error in the center position of the C1-axis in the X direction, an error in the center position of the C1-axis in the Y direction, squareness between the C1-axis and the Y-axis, and squareness between the C1-axis and the X-axis, respectively. The 13 geometric errors in the first axis configuration are obtained in advance by actual measurement and stored in the storage unit 27.

The 15 geometric errors in the second axis configuration are represented by $\delta x_{21}$, $\delta z_{21}$, $\alpha_{21}$, $\beta_{21}$, $\alpha_{22}$, $\gamma_{22}$, $\beta_{23}$, $\gamma_{23}$, $\alpha_{24}$, $\alpha_{25}$, $\beta_{25}$, $\delta x_{26}$, $\delta y_{26}$, $\alpha_{26}$, and $\beta_{26}$ by a method similar to that used for the geometric errors in the first axis configuration. These geometric errors mean an error in the center position of the B-axis in the X direction, an error in the center position of the B-axis in the Z direction, squareness between the second headstock 8 and the Y-axis, an error in the origin of the B-axis, squareness between the B-axis and the Z-axis, squareness between the B-axis and the X-axis, squareness between the Z-axis and the X-axis, squareness between the X-axis and the Y-axis, squareness between the Y-axis and the Z-axis, squareness between the W-axis and the Y-axis, squareness between the W-axis and the X-axis, an error in the center position of the C2-axis in the X direction, an error in the center position of the C2-axis in the Y direction, squareness between the C2-axis and the Y-axis, and squareness between the C2-axis and the X-axis, respectively. The 15 geometric errors in the second axis configuration are also obtained in advance by actual measurement and stored in the storage unit 27.

A method for calculating command values for the translation and rotation axes, which is performed by the numerical control apparatus 20, will be described below with reference to FIGS. 4 and 5. The numerical control apparatus 20 (the command value generation unit 22) is capable of calculating the command values in view of the above geometric errors and the angle $\theta$ (see FIG. 2) by using a calculation program stored in the storage unit 27.

Figure 4:
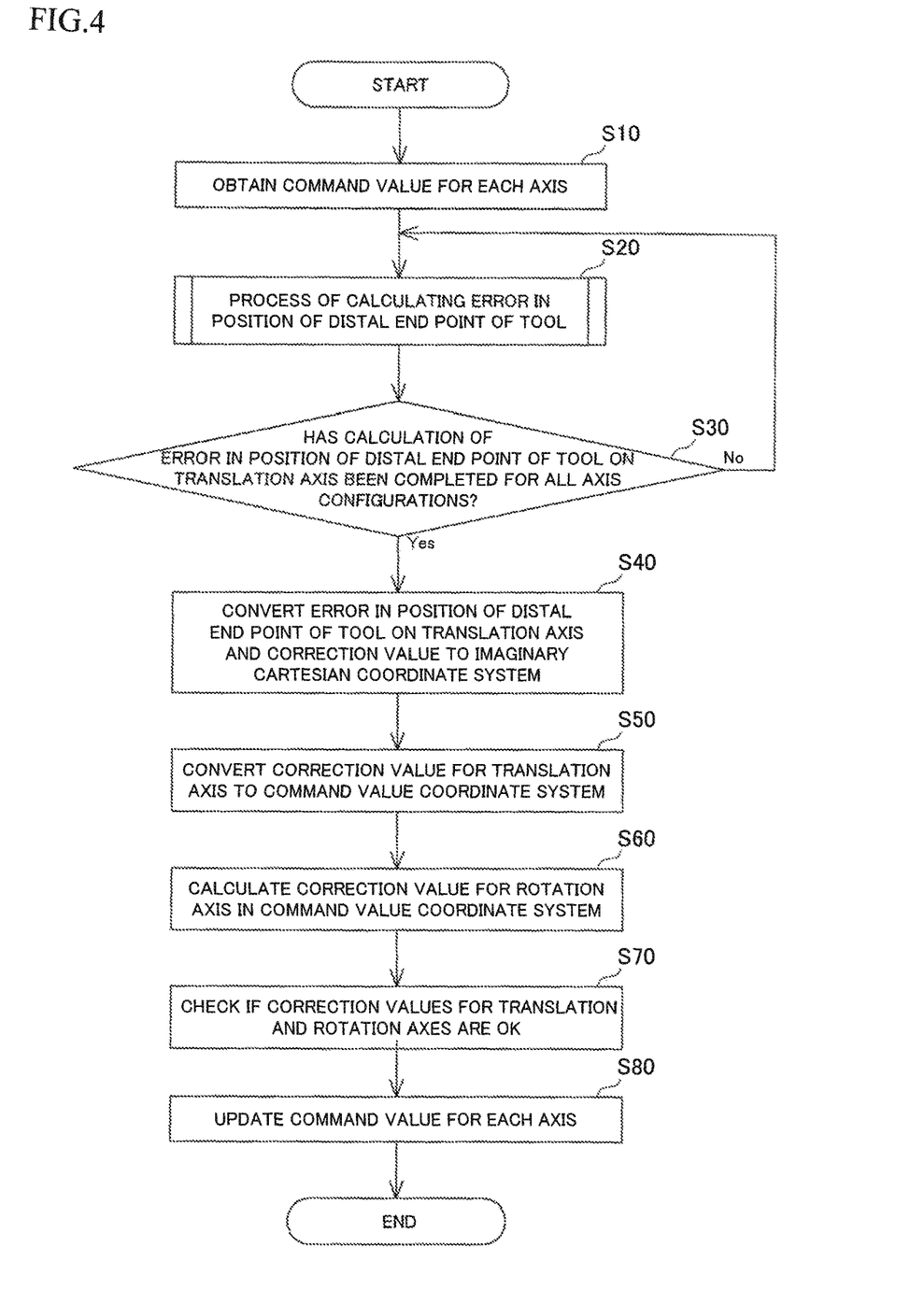
FIG. 4 is a flowchart of a process of calculating a command value for a translation axis.
Figure 5:
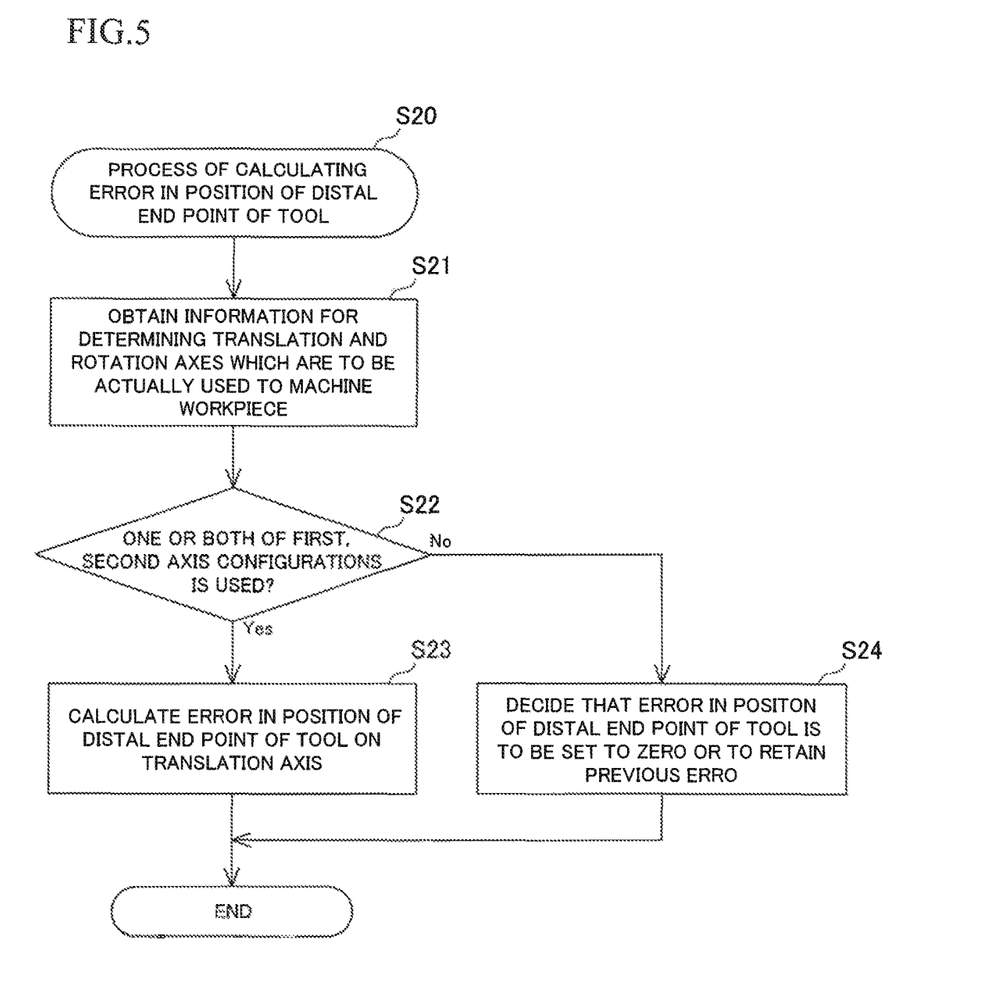
FIG. 5 is a flowchart of a process of calculating an error in the position of the distal end point of a tool in a workpiece coordinate system.

In step S10 of FIG. 4, the command value generation unit 22 obtains a command value for each axis (translation and rotation axes). Specifically, in step S10, the command value generation unit 22 obtains command values for the translation axes (X-axis, Ys-axis, Z-axis, and W-axis) and command values for the rotation axes (B-axis, C1-axis, and C2-axis) from the machining program 21 (see FIG. 3). The command value generation unit 22 then stores the obtained command values in the storage unit 27.

After step S10, the command value generation unit 22 performs in step S20 a process of calculating an error in the position of the distal end point of the tool in a workpiece coordinate system, as described below. In step S20, the command value generation unit 22 performs steps S21 to S24 shown in FIG. 5. In step S21, the command value generation unit 22 obtains information for determining those translation and rotation axes which are to be actually used to machine the workpiece. For example, in step S21, the command value generation unit 22 obtains a program name of the machining program 21 stored in the storage unit 27 (see FIG. 3) for each combination of translation and rotation axes to be actually used. In the present embodiment, the program name of the machining program 21 is different depending on the combination of translation and rotation axes to be actually used. For example, if the program name is "A," the tool 10 machines the workpiece attached to the first headstock 6 (the first spindle portion 7) by the first axis configuration (C1-axis . . . Z-axis . . . Ys-axis . . . X-axis . . . B-axis). If the program name is "B," the tool 10 machines the workpiece attached to the second headstock 8 (the second spindle portion 9) by the second axis configuration (C2-axis . . . W-axis . . . Z-axis . . . Ys-axis . . . X-axis . . . B-axis). If the program name is "C," the tool 10 machines the workpiece attached to the first headstock 6 and the second headstock 8 by the first and second axis configurations.

After step S21, the command value generation unit 22 determines in step S22 whether either one or both of the first and second axis configurations are to be used or not. If the program name obtained in step S21 is "A," the command value generation unit 22 determines in step S22 that the first axis configuration is to be used. If the obtained program name is "B," the command value generation unit 22 determines that the second axis configuration is to be used. If the obtained program name is "C," the command value generation unit 22 determines that both of the first and second axis configurations are to be used. The first and second axis configurations are examples of the arbitrary axis configuration in the present invention. The first or second axis configuration that has been determined to be used is an example of the used axis configuration in the present invention. The Z-axis, the Ys-axis, and the X-axis in the first axis configuration that has been determined to be used and the W-axis, the Z-axis, the Ys-axis, and the X-axis in the second axis configuration that has been determined to be used are examples of the translation axis to be actually used to machine the workpiece in the present invention. The C1-axis and the B-axis in the first axis configuration that has been determined to be used and the C2-axis and the B-axis in the second axis configuration that has been determined to be used are examples of the rotation axis to be actually used to machine the workpiece in the present invention. The program name is an example of the determination information in the present invention. Step S22 is an example of the selection step in the present invention, and the command value generation unit 22 is an example of the selection unit in the present invention.

If it is determined in step S22 that one or both of the first and second axis configurations are to be used, the command value generation unit 22 calculates in step S23 an error in the position of the distal end point of the tool in the workpiece coordinate system of the translation axis, as described below. In the case of converting a tool distal end point vector $^T P$ in a tool coordinate system in the spindle head 2 to the workpiece coordinate system in the first headstock 6 and the second headstock 8, a transformation matrix for each axis is given by the following expression 1, where "t ($t_X$, $t_Y$, $t_Z$)" represents the length of the tool 10, and "i" represents each command position for the B-axis, the C-axis (C1-axis and C2-axis), the X-axis, the Y-axis, the Z-axis, and the W-axis. The command value generation unit 22 calculates a tool distal end point vector $^W P_1$ in the workpiece coordinate system in the absence of geometric errors by using the tool distal end point vector $^T P$ and the transformation matrix for each axis $M_B(i)$, $M_C(i)$, $M_X(i)$, $M_Y(i)$, $M_Z(i)$, and $M_W(i)$.

$$M_B(i) = \begin{bmatrix} \cos i & 0 & \sin i & 0 \\ 0 & 1 & 0 & 0 \\ -\sin i & 0 & \cos i & 0 \\ 0 & 0 & 0 & 1 \end{bmatrix},$$ [Expression 1]

$$M_C(i) = \begin{bmatrix} \cos i & -\sin i & 0 & 0 \\ \sin i & \cos i & 0 & 0 \\ 0 & 0 & 1 & 0 \\ 0 & 0 & 0 & 1 \end{bmatrix},$$

$$M_X(i) = \begin{bmatrix} 1 & 0 & 0 & i \\ 0 & 1 & 0 & 0 \\ 0 & 0 & 1 & 0 \\ 0 & 0 & 0 & 1 \end{bmatrix}, \quad M_Y(i) = \begin{bmatrix} 1 & 0 & 0 & 0 \\ 0 & 1 & 0 & i \\ 0 & 0 & 1 & 0 \\ 0 & 0 & 0 & 1 \end{bmatrix},$$

$$M_Z(i) = \begin{bmatrix} 1 & 0 & 0 & 0 \\ 0 & 1 & 0 & 0 \\ 0 & 0 & 1 & i \\ 0 & 0 & 0 & 1 \end{bmatrix}, \quad M_W(i) = \begin{bmatrix} 1 & 0 & 0 & 0 \\ 0 & 1 & 0 & 0 \\ 0 & 0 & 1 & i \\ 0 & 0 & 0 & 1 \end{bmatrix}$$

$$^T P = \begin{bmatrix} -t_X \\ -t_Y \\ -t_Z \\ 1 \end{bmatrix}$$

In the present embodiment, the Ys-axis is inclined by the angle θ with respect to the Y-axis, as shown in FIG. 2. A rotation transformation matrix for rotating the Ys-axis toward the Y-axis by the angle θ about the Z-axis is given by the following expression 2. The command value generation unit 22 performs a homogenous coordinate transformation from the tool coordinate system in the absence of geometric errors to the workpiece coordinate system in the first axis configuration in the absence of geometric errors by using the following expression 3. The command value generation unit 22 thus calculates an ideal tool distal end point vector $^W P_{l1}$ in the workpiece coordinate system in the first axis configuration in the absence of geometric errors. The command value generation unit 22 performs a homogenous coordinate transformation from the tool coordinate system in the absence of geometric errors to the workpiece coordinate system in the second axis configuration in the absence of geometric errors by using the following expression 4. The command value generation unit 22 thus calculates an ideal tool distal end point vector $^W P_{l2}$ in the workpiece coordinate system in the second axis configuration in the absence of geometric errors. In the expression 3, "$c_1$" represents a command position for the C1-axis, "z" represents a command position for the Z-axis, "ys" represents a command position for the Ys-axis, "x" represents a command position for the X-axis, and "b" represents a command position for the B-axis. In the expression 4, "$c_2$" represents a command position for the C2-axis, "w" represents a command position for the W-axis, "z" represents a command position for the Z-axis, "ys" represents a command position for the Ys-axis, "x" represents a command position for the X-axis, and "b" represents a command position for the B-axis.

$$O_c(\theta) = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$ [Expression 2]

$$^W P_{l1} = M_C(c_1) \cdot M_Z(z) \cdot M_Y(ys) \cdot O_C(\theta)^{-1} \cdot M_X(x) \cdot M_B(b) \cdot {}^T P$$ [Expression 3]

$$^W P_{l2} = M_C(c_2) \cdot M_W(w) \cdot M_Z(z) \cdot M_Y(ys) \cdot O_C(\theta)^{-1} \cdot M_X(x) \cdot M_B(b) \cdot {}^T P$$ [Expression 4]

In step S23, in the case where there is any geometric error in the multitasking lathe 1, each geometric error is regarded as a relative error between the axes. Accordingly, a matrix $\varepsilon_{jk}$ which is given by the following expression 5 using translation errors δx, δy, and δz and rotation errors α, β, and γ of each geometric error stored in the storage unit 27 is a transformation matrix for the geometric error. The command value generation unit 22 performs a homogenous coordinate transformation from the tool coordinate system in the presence of the geometric error to the workpiece coordinate system in the first axis configuration in the presence of the geometric error by using the following expression 6. The expression 6 corresponds to the expression 3 having the matrix $\varepsilon_{jk}$ placed between the axes. The command value generation unit 22 thus calculates a tool distal end point vector $^W P_{G1}$ in the workpiece coordinate system in the first axis configuration in the presence of the geometric error. The command value generation unit 22 also performs a homogenous coordinate transformation from the tool coordinate system in the presence of the geometric error to the workpiece coordinate system in the second axis configuration in the presence of the geometric error by using the following expression 7. The expression 7 corresponds to the expression 4 having the matrix $\varepsilon_{jk}$ placed between the axes. The command value generation unit 22 thus calculates a tool distal end point vector $^W P_{G2}$ in the workpiece coordinate system in the second axis configuration in the presence of the geometric error. The first subscript "j" in the matrix $\varepsilon_{jk}$ represents the axis configuration number (in this example, first or second), and the second subscript "k" in the matrix $\varepsilon_{jk}$ represents the order of the axes having a geometric error therebetween from the tool 10 toward the workpiece.

$$\varepsilon_{jk}(\theta) = \begin{bmatrix} 1 & -\gamma_{jk} & \beta_{jk} & \delta x_{jk} \\ \gamma_{jk} & 1 & -\alpha_{jk} & \delta y_{jk} \\ -\beta_{jk} & \alpha_{jk} & 1 & \delta z_{jk} \\ 0 & 0 & 0 & 1 \end{bmatrix}$$ [Expression 5]

$$^W P_{G1} = \varepsilon_{16} \cdot M_C(c_1) \cdot \varepsilon_{15} \cdot M_Z(z) \cdot \varepsilon_{14} \cdot M_Y(ys) \cdot O_C(\theta)^{-1} \cdot \varepsilon_{13} \cdot M_X(x) \cdot \varepsilon_{12} \cdot M_B(b) \cdot \varepsilon_{11} \cdot {}^T P$$ [Expression 6]

$$^W P_{G2} = \varepsilon_{27} \cdot M_C(c_2) \cdot \varepsilon_{26} \cdot M_W(w) \cdot \varepsilon_{25} \cdot M_Z(z) \cdot \varepsilon_{24} \cdot M_Y(ys) \cdot O_C(\theta)^{-1} \cdot \varepsilon_{23} \cdot M_X(x) \cdot \varepsilon_{22} \cdot M_B(b) \cdot \varepsilon_{21} \cdot {}^T P$$ [Expression 7]

Subsequently, in step S23, the command value generation unit 22 calculates a position error $\Delta e_j$ of the distal end point of the tool in the workpiece coordinate system by using the following expression 8. If it is determined in step S22 that the first axis configuration is to be used, the command value generation unit 22 calculates in step S23 a position error $\Delta e_1$ of the distal end point of the tool in the workpiece coordinate system in the first axis configuration from the difference by using the expression 8. The difference is between the tool distal end point vector $^W P_{G1}$ calculated by the expression 6 and the tool distal end point vector $^W P_{11}$ calculated by the expression 3. If it is determined in step S22 that the second axis configuration is to be used, the command value generation unit 22 calculates in step S23 a position error $\Delta e_2$ of the distal end point of the tool in the workpiece coordinate system in the second axis configuration from the difference by using the expression 8. The difference is between the tool distal end point vector $^W P_{G2}$ calculated by the expression 7 and the tool distal end point vector $^W P_{12}$ calculated by the expression 4. If it is determined in step S22 that both of the first and second axis configurations are to be used, the command value generation unit 22 calculates the position error $\Delta e_1$ and the position error $\Delta e_2$ in step S23. The position errors $\Delta e_1$, $\Delta e_2$ calculated in step S23 are stored in the storage unit 27. Step 23 is thus completed.

$$\Delta e_j = \begin{bmatrix} \Delta x_j \\ \Delta y_j \\ \Delta z_j \\ 1 \end{bmatrix} = {}^W P_{Gj} - {}^W P_{lj}$$ [Expression 8]

If it is determined in step S22 that one of the first and second axis configurations is not to be used, the command value generation unit 22 decides in step S24 that the error in the position of the distal end point of the tool in the axis configuration which is not used is to be set to zero or to retain the previous error. The "previous error" means the position error $\Delta e_1$, $\Delta e_2$ that has been stored in the storage unit 27 at the time it is determined in step S22 that one of the first and second axis configurations is not to be used. Performing step S24 can omit calculation of the position error $\Delta e_j$ of the distal end point of the tool in the workpiece coordinate system regarding those translation axes which are not to be used to machine the workpiece. Step S24 is an example of the error decision step in the present invention. The command value generation unit 22 is an example of the error decision unit in the present invention. Of the first and second axis configurations, the axis configuration that is determined not to be used in step S22 is an example of the axis configuration that is not to be used to machine the workpiece in the present invention.

After step S20, the command value generation unit 22 determines in step S30 whether calculation of the error in the position of the distal end point of the tool on the translation axis has been completed for all the axis configurations or not. In this example, the command value generation unit 22 determines whether the position error $\Delta e_1$, $\Delta e_2$ corresponding to the axis configuration determined to be used in step S22 has been stored in the storage unit 27 or not. If it is determined in step S30 that the position error $\Delta e_1$, $\Delta e_2$ corresponding to this axis configuration has not been stored in the storage unit 27 and that calculation of the error in the position of the distal end point of the tool has not been completed for all the axis configurations, the command value generation unit 22 performs step S20.

If it is determined in step S30 that calculation of the error in the position of the distal end point of the tool on the translation axis has been completed for all the axis configurations, the command value generation unit 22 converts the error in the position of the distal end point of the tool on the translation axis from the workpiece coordinate system to an imaginary Cartesian coordinate system, and further converts a correction value for correcting this error to the imaginary Cartesian coordinate system in step S40 as described below. The term "imaginary Cartesian coordinate system" refers to a coordinate system in which two translation axes, namely, the X-axis and the Z-axis, and the imaginary Y-axis are perpendicular to each other, as shown in the example of FIG. 2. In step S40, the command value generation unit 22 performs a homogeneous transformation from the workpiece coordinate system to the imaginary Cartesian coordinate system by using the following expression 9 including the rotation transformation matrix given by the expression 2. The command value generation unit 22 thus calculates a correction value vector $\Delta Comp_j'$ for the translation axis in the imaginary Cartesian coordinate system that cancels this error. In the expression 9, "j" represents the axis configuration number (in this example, first or second), and "θ" represents an inclination angle of the Ys-axis with respect to the Y-axis. In the case of j=1, "m" represents a command position for the rotation axis C1. In the case of j=2, "m" represents a command position for the rotation axis C2. If it is determined in step S22 that the first axis configuration is to be used, the command value generation unit 22 calculates in step S40 a correction value vector $\Delta Comp_1'$ for the translation axis in the imaginary Cartesian coordinate system in the first axis configuration by using the expression 9. If it is determined in step S22 that the second axis configuration is to be used, the command value generation unit 22 calculates in step S40 a correction value vector $\Delta Comp_2'$ for the translation axis in the imaginary Cartesian coordinate system in the second axis configuration by using the expression 9. If it is determined in step S22 that both of the first and second axis configurations are to be used, the correction value vector $\Delta Comp_1'$ and the correction value vector $\Delta Comp_2'$ are calculated in step S40. The direction of the Y-axis is an example of the predetermined reference direction in the present invention, and the Ys-axis is an example of the translation axis included in the two or more translation axes that are not perpendicular to each other in the present invention. The angle θ shown in FIG. 2 is an example of the inclination angle in the present invention, and the XYZ coordinate system shown in FIG. 2 is an example of the one imaginary Cartesian coordinate system and the arbitrary imaginary Cartesian coordinate system in the present invention. Step 40 is an example of the conversion step in the present invention, and the command value generation unit 22 is an example of the conversion unit in the present invention.

$$\Delta Comp'_j = \begin{bmatrix} \Delta Cx'_j \\ \Delta Cy'_j \\ \Delta Cz'_j \\ 1 \end{bmatrix} = -O_c(\theta) \cdot M_c(m)^{-1} \cdot \Delta e_j \quad \text{[Expression 9]}$$

After step S40, the command value generation unit 22 converts in step S50 the correction value for the translation axis which has been converted to the imaginary Cartesian coordinate system in step S40 to a command value coordinate system serving as a coordinate system of a command value for the translation axis (X-axis, Ys-axis. Z-axis), as described below. In the first axis configuration of the present embodiment, the command value coordinate system is located between the C1-axis and the Z-axis, namely, between the first rotation axis and the first translation axis on the workpiece side. In the second axis configuration, the command value coordinate system is located between the C2-axis and the W-axis, namely, between the first rotation axis and the first translation axis on the workpiece side. In step S50, the command value generation unit 22 performs a homogeneous transformation from the imaginary Cartesian coordinate system to the command value coordinate system by using the following expression 10. The expression 10 includes a transformation matrix that represents the relation between the translation axes in which the Ys-axis is inclined by the angle θ with respect to the Y-axis. The command value generation unit 22 thus calculates a correction value vector $\Delta Comp_j$, which is obtained by converting the command value vector $\Delta Comp_j'$ calculated in step S40 to the command value coordinate system. If it is determined in step S22 that the first axis configuration is to be used, the command value generation unit 22 calculates in step S50 a correction value vector $\Delta Comp_1$ in the command value coordinate system in the first axis configuration by using the expression 10. If it is determined in step S22 that the second axis configuration is to be used, the command value generation unit 22 calculates in step S50 a correction value vector $\Delta Comp_2$ in the command value coordinate system in the second axis configuration by using the expression 10. If it is determined in step S22 that both of the first and second axis configurations are to be used, the command value generation unit 22 calculates the correction value vector $\Delta Comp_1$ and the correction value vector $\Delta Comp_2$ in step S50. Step S50 is an example of the correction value calculation step in the present invention, and the command value generation unit 22 is an example of the correction value calculation unit in the present invention.

$$\Delta Comp_j = \begin{bmatrix} \Delta Cx_j \\ \Delta Cy_j \\ \Delta Cz_j \\ 1 \end{bmatrix} = \begin{bmatrix} 1 & \tan\theta & 0 & 0 \\ 0 & \frac{1}{\cos\theta} & 0 & 0 \\ 0 & 0 & 1 & 0 \\ 0 & 0 & 0 & 1 \end{bmatrix} \cdot \Delta Comp'_j \quad \text{[Expression 10]}$$

After step S50, the command value generation unit 22 calculates in step S60 correction values for the C-axis (C1-axis, C2-axis) and the B-axis serving as the rotation axes in the command value coordinate system. In step S60, the command value generation unit 22 calculates a correction value $\Delta Cc_j$ for the C-axis in the command value coordinate system and a correction value $\Delta Cb_j$ for the B-axis in the command value coordinate system by using the following expression 11. If it is determined in step S22 that the first axis configuration is to be used, the command value generation unit 22 calculates in step S60 a correction value $\Delta Cc_1$ for the C1-axis and a correction value $\Delta Cb_1$ for the B-axis in the command value coordinate system in the first axis configuration by using the expression 11. If it is determined in step S22 that the second axis configuration is to be used, the command value generation unit 22 calculates in step S60 a correction value $\Delta Cc_2$ for the C2-axis and a correction value $\Delta Cb_2$ for the B-axis in the command value coordinate system in the second axis configuration by using the expression 11. If it is determined in step S22 that both of the first and second axis configurations are to be used, the command value generation unit 22 calculates the correction values $\Delta Cc_1$, $\Delta Cc_2$ and the correction values $\Delta Cb_1$, $\Delta Cb_2$ in step S60.

$$\begin{cases} \Delta Cc_j = -\sum_{k=Is1}^{Ie1} \gamma_{jk} \\ \Delta Cb_j = -\sum_{k=Is2}^{Ie2} \beta_{jk} \end{cases} \quad \text{[Expression 11]}$$

In the expression 11, "Is1," "Ie1," "Is2," and "Ie2" are as shown in the table below.

| j (Axis Configuration) | Is1 | Ie1 | Is2 | Ie2 |
|---|---|---|---|---|
| 1 | 2 | 6 | 1 | 5 |
| 2 | 2 | 7 | 1 | 6 |

After step S60, the command value generation unit 22 checks in step S70 if the correction value for the translation axis which has been converted to the command value coordinate system in step S50 is ok, and if the correction value for the rotation axis in the command value coordinate system obtained in step S60 is ok. In step S70, the command value generation unit 22 checks if each correction value is larger than a preset upper limit threshold or smaller than a preset lower limit threshold. After it is confirmed that each correction value is not larger than the upper limit threshold and not smaller than the lower limit threshold, the command value generation unit 22 stores each correction value in the storage unit 27. On the other hand, if it is confirmed that any correction value is larger than the upper limit threshold or smaller than the lower limit threshold, the command value generation unit 22 does not store this correction value in the storage unit 27. Thus, a lamp is provided in the multitasking lathe 1 to emit light in order to notify, the user of the abnormal correction value.

After step S70, the command value generation unit 22 updates the command value for each axis (translation and rotation axes) in step S80. In step S80, the command value generation unit 22 adds the correction value for the translation axis which is stored in the storage unit 27 in step S70 to the command value for the translation axis which is obtained and stored in the storage unit 27 in step S10. The command value for the translation axis (X-axis, Ys-axis, Z-axis, W-axis) is updated in this manner. In step S80, the command value generation unit 22 also adds the correction value for the rotation axis which is stored in the storage unit 27 in step S70 to the command value for the rotation axis which is obtained and stored in the storage unit 27 in step S10. The command value for the rotation axis (B-axis, C1-axis, C2-axis) is updated in this manner. Step S80 is an example of the update step in the present invention, and the command value generation unit 22 is an example of the update unit in the present invention.

(Effects of the Present Embodiment)

In the method and apparatus for controlling the multitasking lathe 1 according to the present embodiment, the command value generation unit 22 can calculate the correction value (correction value vector $\Delta Comp_j$) for correcting the position error $\Delta e_j$ in the command value coordinate system of the translation axis by a simple method. Namely, in step S40, a homogeneous coordinate transformation of the position error $\Delta e_j$ and the correction value vector $\Delta Comp_j'$ for correcting the position error $\Delta e_j$ is performed from the workpiece coordinate system to the imaginary Cartesian coordinate system. The position error $\Delta e_j$ is the distal end point of the tool 10 with respect to the workpiece on the translation axis due to a geometric error. In step S50, a homogeneous transformation of the correction value vector $\Delta Comp_j'$ in the imaginary Cartesian coordinate system is performed to the command value coordinate system of the translation axis. The command value generation unit 22 can then update in step S80 the command value by a simple method, namely, by adding the calculated correction value to the command value for controlling the translation axis (X-axis, Ys-axis, Z-axis, W-axis). Combining these simple methods allows the command value generation unit 22 to correct the geometric error of the multitasking lathe 1 including two or more translation axes (X-axis, Ys-axis, and Z-axis) that are not perpendicular to each other, and the command value for the translation axis is calculated.

In step S40, a calculation is made by using the expression 9 including the rotation transformation matrix so that the command value generation unit 22 can specify the inclination angle θ of the Ys-axis serving as a translation axis included in the two or more translation axes (X-axis, Ys-axis, and Z-axis) that are not perpendicular to each other with respect to the direction of the Y-axis. Further, according to the calculation using the expression 9, a homogeneous coordinate transformation of the position error $\Delta e_j$ of the distal end point of the tool 10 and the correction value (correction value vector $\Delta Comp_j'$) for correcting the position error $\Delta e_j$ can be performed from the workpiece coordinate system to the imaginary Cartesian coordinate system.

Moreover, the command value generation unit 22 can calculate in step S50 the correction value (correction value vector $\Delta Comp_j$) for correcting the position error $\Delta e_j$ of the distal end point of the tool 10. The correction value (correction value vector $\Delta Comp_j$) is calculated by corresponding the Z-axis, the Ys-axis, and the X-axis in the first axis configuration 1 which are determined to be actually used to machine the workpiece in step S22 or the W-axis, the Z-axis, the Ys-axis, and the X-axis in the second axis configuration 2 which are determined to be actually used to machine the workpiece in step S22.

Moreover, if it is determined in step S22 that one of the first and second axis configurations is not to be used to machine the workpiece, the command value generation unit 22 decides in step S24 that the position error $\Delta e_j$ of the distal end point of the tool 10 in the axis configuration that is not used is to be set to zero or to retain the previous error. Calculation of the position error $\Delta e_j$ in the workpiece coordinate system can thus be omitted for the first axis configuration or the second axis configuration that is not used to machine the workpiece. This can reduce calculation load for calculation of the position error $\Delta e_j$.

The present invention is not limited to the above embodiment, and can be embodied by partially modifying the configuration as appropriate without departing from the spirit and scope of the invention. The above embodiment is described with respect to an example in which the present invention is applied to the multitasking lathe 1. However, the present invention is not limited to this. For example, the present invention is also applicable to, e.g., a 4 or more-axis machining center or a multitasking lathe having a plurality of tool rests and a plurality of headstocks.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method for controlling a machine tool in which a main spindle on which a tool is mounted and a table that holds a workpiece are moved relative to each other by two or more machine tool translation axes and at least one machine tool rotation axis to machine the workpiece with the tool, at least two of the machine tool translation axes not perpendicular to each other, the method comprising:
obtaining a position of the tool in presence of a geometric error by performing a homogeneous coordinate transformation from a tool coordinate system to a workpiece coordinate system with the geometric error being taken into consideration,
obtaining an ideal position of the tool by performing the homogeneous coordinate transformation from the tool coordinate system to the workpiece coordinate system with the geometric error not being taken into consideration, calculating an error in the position of the tool with respect to the workpiece due to the geometric error from the position of the tool in presence of the geometric error and the ideal position of the tool, converting the error in the position of the tool with respect to the workpiece into an imaginary Cartesian coordinate system that comprises two or more Cartesian coordinate system axes that are perpendicular to each other, and converting a workpiece coordinate system correction value for correcting the error in the position of the tool with respect to the workpiece into an imaginary Cartesian coordinate system correction value in the imaginary Cartesian coordinate system by performing a homogeneous coordinate transformation from the workpiece coordinate system to the imaginary Cartesian coordinate system;

calculating a command value coordinate system correction value in a command value coordinate system by performing a homogeneous coordinate transformation of the imaginary Cartesian coordinate system correction value, converted into the imaginary Cartesian coordinate system in said converting the error, from the imaginary Cartesian coordinate system into the command value coordinate system;

calculating an updated command value by updating a command value for controlling the machine tool, by adding the command value coordinate system correction value, calculated in said calculating a correction value, to the command value; and controlling the machine tool to perform the method based on the updated command value.

2. The method according to claim 1, wherein in said converting the error, the homogeneous coordinate transformation of the error in the position of the tool with respect to the workpiece and the workpiece coordinate system correction value for correcting the error in the position of the tool with respect to the workpiece from the workpiece coordinate system into the imaginary Cartesian coordinate system is performed in view of an inclination angle of the machine tool translation axis included in the two or more machine tool translation axes that are not perpendicular to each other with respect to a predetermined reference direction.

3. The method according to claim 1, wherein the method further comprises:

selecting an arbitrary axis configuration, said arbitrary axis configuration comprising at least two arbitrary axis configuration translation axes that are perpendicular to each other, said arbitrary axis configuration comprising at least one arbitrary axis configuration translation axis selected from among the two or more machine tool translation axes and at least one arbitrary axis configuration rotation axis selected from among the at least one machine tool rotation axis, wherein in said converting the error, the error in the position of the tool with respect to the workpiece and the workpiece coordinate system correction value are converted into an arbitrary imaginary Cartesian coordinate system that comprises two or more arbitrary imaginary Cartesian coordinate system axes that are among the at least two arbitrary axis configuration translation axes of the arbitrary axis configuration and that are perpendicular to each other, by performing the homogeneous coordinate transformation from the workpiece coordinate system to the arbitrary imaginary Cartesian coordinate system, and in said calculating a command value coordinate system correction value, the command value coordinate system correction value is calculated by performing the homogeneous coordinate transformation of the imaginary Cartesian coordinate system correction value, converted into the arbitrary imaginary Cartesian coordinate system in said converting the error, from the arbitrary imaginary Cartesian coordinate system into the command value coordinate system.

4. The method according to claim 3, wherein said at least one arbitrary axis configuration translation axis selected from among the two or more machine tool translation axes is to be actually used to machine the workpiece, and said at least one arbitrary axis configuration rotation axis is to be actually used to machine the workpiece, a used axis configuration that comprises only the one or more machine tool translation axes to be actually used to machine the workpiece and the one or more machine tool rotation axes to be actually used to machine the workpiece is selected as the arbitrary axis configuration, and the imaginary Cartesian coordinate system comprises said at least two arbitrary axis configuration translation axes that are perpendicular to each other and that are included in the arbitrary imaginary Cartesian coordinate system.

5. The method according to claim 4, wherein the method further comprises:

deciding that the error in the position of the tool with respect to the workpiece, in a first selectable axis configuration that comprises at least one machine tool translation axis and at least one machine tool rotation axis, is to retain a previous error or to be set to zero if it is determined that said first selectable axis configuration is not to be used to machine the workpiece.

6. The method according to claim 2, wherein said method further comprises:

selecting an arbitrary axis configuration, said arbitrary axis configuration comprising at least two arbitrary axis configuration translation axes that are perpendicular to each other, said arbitrary axis configuration comprising at least one arbitrary axis configuration translation axis selected from among the two or more machine tool translation axes and at least one arbitrary axis configuration rotation axis selected from among the at least one machine tool rotation axis, wherein in said converting the error, the error in the position of the tool with respect to the workpiece and the workpiece coordinate system correction value are converted into an arbitrary imaginary Cartesian coordinate system that comprises two or more arbitrary imaginary Cartesian coordinate system axes that are among the at least two arbitrary axis configuration translation axes of the arbitrary axis configuration and that are perpendicular to each other, by performing the homogeneous coordinate transformation from the workpiece coordinate system to the arbitrary imaginary Cartesian coordinate system, and in said calculating a command value coordinate system correction value, the command value coordinate system correction value is calculated by performing the homogeneous coordinate transformation of the imaginary Cartesian coordinate system correction value, converted into the arbitrary imaginary Cartesian coordinate system in said converting the error, from the arbitrary imaginary Cartesian coordinate system into the command value coordinate system.

7. An apparatus for controlling a machine tool in which a main spindle on which a tool is mounted and a table that holds a workpiece are moved relative to each other by two or more machine tool translation axes and at least one machine tool rotation axis to machine the workpiece with the tool, at least two of the machine tool translation axes not perpendicular to each other, the apparatus comprising:

an error calculation unit that [1] obtains a position of the tool in presence of a geometric error by performing a homogeneous coordinate transformation from a tool coordinate system to a workpiece coordinate system with the geometric error being taken into consideration, and [2] obtains an ideal position of the tool by performing the homogeneous coordinate transformation from the tool coordinate system to the workpiece coordinate system with the geometric error not being taken into consideration, and [3] calculates an error in a position of the tool with respect to the workpiece due to the geometric error from the position of the tool in presence of the geometric error and the ideal position of the tool;

a conversion unit that converts the error in the position of the tool with respect to the workpiece into an imaginary Cartesian coordinate system that comprises two or more Cartesian coordinate system axes that are perpendicular to each other, and converts a workpiece coordinate system correction value for correcting the error in the position of the tool with respect to the workpiece into an imaginary Cartesian coordinate system correction value in the imaginary Cartesian coordinate system by performing a homogeneous coordinate transformation from the workpiece coordinate system to the imaginary Cartesian coordinate system;

a correction value calculation unit that calculates a command value coordinate system correction value in a command value coordinate system by performing a homogeneous coordinate transformation of the imaginary Cartesian coordinate system correction value converted into the imaginary Cartesian coordinate system by the conversion unit from the imaginary Cartesian coordinate system into the command value coordinate system;

an update unit that calculates an updated command value by updating a command value for controlling the machine tool by adding the command value coordinate system correction value calculated by the correction value calculation unit to the command value, the main spindle and the table configured to move relative to one another in response to the updated command value.

8. The apparatus according to claim 7, wherein the conversion unit performs the homogeneous coordinate transformation of the error in the position of the tool with respect to the workpiece and the workpiece coordinate system correction value from the workpiece coordinate system to the imaginary Cartesian coordinate system in view of an inclination angle of the machine tool translation axis included in the two or more machine tool translation axes that are not perpendicular to each other with respect to a predetermined reference direction.

9. The apparatus according to claim 7, wherein:
the apparatus further comprises a selection unit that selects an arbitrary axis configuration, said arbitrary axis configuration comprising at least two arbitrary axis configuration translation axes that are perpendicular to each other, said arbitrary axis configuration comprising at least one arbitrary axis configuration translation axis selected from among the two or more machine tool translation axes and at least one arbitrary axis configuration rotation axis selected from among the at least one machine tool rotation axis, the conversion unit converts the error in the position of the tool with respect to the workpiece and the workpiece coordinate system correction value into an arbitrary imaginary Cartesian coordinate system that comprises two or more arbitrary imaginary Cartesian coordinate system axes that are among the at least two arbitrary axis configuration translation axes of the arbitrary axis configuration and that are perpendicular to each other, by performing the homogeneous coordinate transformation from the workpiece coordinate system to the arbitrary imaginary Cartesian coordinate system, and the correction value calculation unit calculates the command value coordinate system correction value in the command value coordinate system by performing the homogeneous coordinate transformation of the imaginary Cartesian coordinate system correction value, converted into the arbitrary imaginary Cartesian coordinate system from the arbitrary imaginary Cartesian coordinate system to the command value coordinate system.

10. The apparatus according to claim 8, wherein:
the apparatus further comprises a selection unit that selects an arbitrary axis configuration, said arbitrary axis configuration comprising at least two arbitrary axis configuration translation axes that are perpendicular to each other, said arbitrary axis configuration comprising at least one arbitrary axis configuration translation axis selected from among the two or more machine tool translation axes and at least one arbitrary axis configuration rotation axis selected from among the at least one machine tool rotation axis, the conversion unit converts the error in the position of the tool with respect to the workpiece and the workpiece coordinate system correction value into an arbitrary imaginary Cartesian coordinate system that comprises two or more arbitrary imaginary Cartesian coordinate system axes that are among the at least two arbitrary axis configuration translation axes of the arbitrary axis configuration that are perpendicular to each other by performing the homogeneous coordinate transformation from the workpiece coordinate system to the arbitrary imaginary Cartesian coordinate system, and the correction value calculation unit calculates the command value coordinate system correction value in the command value coordinate system by performing the homogeneous coordinate transformation of the imaginary Cartesian coordinate system correction value, converted into the arbitrary imaginary Cartesian coordinate system from the arbitrary imaginary Cartesian coordinate system to the command value coordinate system.

11. The apparatus according to claim 9, wherein:
said at least one arbitrary axis configuration translation axis selected from among the two or more machine tool translation axes is to be actually used to machine the workpiece, and said at least one arbitrary axis configuration rotation axis is to be actually used to machine the workpiece, the apparatus further comprises a storage unit that stores determination information for each of at least one used axis configuration, said determination information comprising, for each said used axis configuration, one or more machine tool translation axes to be actually used to machine the workpiece and one or more machine tool rotation axes to be actually used to machine the workpiece, the selection unit determines, based on the determination information stored in the storage unit a used axis configuration that comprises only the one or more machine tool translation axes actually used to machine the workpiece and the one or more machine tool rotation axes actually used to machine the workpiece, the imaginary Cartesian coordinate system comprises said at least two arbitrary axis configuration translation axes that are perpendicular to each other and that are included in the arbitrary imaginary Cartesian coordinate system.

12. The apparatus according to claim 10, wherein said at least one arbitrary axis configuration translation axis selected from among the two or more machine tool translation axes is to be actually used to machine the workpiece, and said at least one arbitrary axis configuration rotation axis is to be actually used to machine the workpiece, the apparatus further comprises a storage unit that stores determination information for each of at least one used axis configuration, said determination information comprising, for each said used axis configuration, one or more machine tool translation axes to be actually used to machine the workpiece and one or more machine tool rotation axes to be actually used to machine the workpiece, the selection unit determines, based on the determination information stored in the storage unit a used axis configuration that comprises only the one or more machine tool translation axes actually used to machine the workpiece and the one or more machine tool rotation axes actually used to machine the workpiece, the imaginary Cartesian coordinate system comprises said at least two arbitrary axis configuration translation axes that are perpendicular to each other and that are included in the arbitrary imaginary Cartesian coordinate system.

13. The apparatus according to claim 11, wherein the apparatus further comprises:

an error decision unit that decides that the error in the position of the tool with respect to the workpiece, in a first selectable axis configuration that comprises at least one machine tool translation axis and at least one machine tool rotation axis, is to retain a previous error or to be set to zero if it is determined by the selection unit that said first selectable axis configuration is not to be used to machine the workpiece.

14. The apparatus according to claim 12, wherein the apparatus further comprises:

an error decision unit that decides that the error in the position of the tool with respect to the workpiece, in a first selectable axis configuration that comprises at least one machine tool translation axis and at least one machine tool rotation axis, is to retain a previous error or to be set to zero if it is determined by the selection unit that said first selectable axis configuration is not to be used to machine the workpiece.

* * * * *